(12) United States Patent
Farrer et al.

(10) Patent No.: US 8,417,054 B2
(45) Date of Patent: Apr. 9, 2013

(54) SYSTEM AND METHOD FOR OPTIMIZING CAMERA SETTINGS

(75) Inventors: Steven M. Farrer, Santa Clara, CA (US); Neil Morrow, McKinney, TX (US)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 13/345,618

(22) Filed: Jan. 6, 2012

(65) Prior Publication Data

US 2012/0106795 A1 May 3, 2012

Related U.S. Application Data

(63) Continuation of application No. 12/012,847, filed on Feb. 6, 2008, now Pat. No. 8,111,942.

(51) Int. Cl.
*G06K 9/40* (2006.01)

(52) U.S. Cl.
USPC ......................................................... 382/274

(58) Field of Classification Search .................. 382/159, 382/165, 181, 274; 706/20; 725/19
See application file for complete search history.

(56) References Cited

U.S. PATENT DOCUMENTS

| | | | |
|---|---|---|---|
| 2004/0169817 A1* | 9/2004 | Grotehusmann et al. | 351/204 |
| 2006/0173328 A1* | 8/2006 | Fan et al. | 600/441 |

* cited by examiner

*Primary Examiner* — Gregory F Cunningham
(74) *Attorney, Agent, or Firm* — SNR Denton US LLP

(57) ABSTRACT

There is provided a recognition system. The recognition system is coupled to an image capturing device, and determines a first matching percentage by comparing a first live image with a first reference image, determines a second matching percentage by comparing a second live image with the first reference image, compares the first matching percentage with the second matching percentage to determine a direction of adjustment of a setting of the image capturing device, and generates a feedback signal to adjust the setting based on the direction of adjustment. The first live image and second live image are captured by the image capturing device.

21 Claims, 4 Drawing Sheets

SYSTEM AND METHOD FOR OPTIMIZING CAMERA SETTINGS

RELATED APPLICATION

This application is a Continuation Application of the co-pending, commonly-owned U.S. patent application with Ser. No. 12/012,847, filed Feb. 6, 2008, by Steven M. Farrer and Neil Morrow, and entitled "System and Method for Optimizing Camera Settings," the teachings of which are incorporated herein by reference.

TECHNICAL FIELD

The invention relates to the field of cameras.

BACKGROUND

A facial recognition system is a system that can automatically identify a person by matching a live image of the person to a reference image.

FIG. 1 illustrates a conventional facial recognition system 100 including a camera 102, a reference image database 104, and a comparator 106. Some reference images are stored in the reference image database 104. The camera 102 captures a live image of a user and forwards the live image to the comparator 106. The comparator 106 compares the live image with the reference images in the reference image database 104, and generates a recognition result indicating whether the live image can match to a reference image.

This conventional facial recognition system may perform well when the current environment (the lighting and direction of lighting, etc.) is similar to the environment in which the reference image is taken. However, when the current environment is different from the environment in which the reference image is taken, the performance of the facial recognition system can drop significantly and the live image of the user may not match to any reference image in the database, which may lead to a high possibility of recognition failure.

SUMMARY

According to one embodiment of the invention, there is provided a recognition system. The recognition system is coupled to an image capturing device, and determines a first matching percentage by comparing a first live image with a first reference image, determines a second matching percentage by comparing a second live image with the first reference image, compares the first matching percentage with the second matching percentage to determine a direction of adjustment of a setting of the image capturing device, and generates a feedback signal to adjust the setting based on the direction of adjustment. The first live image and second live image are captured by the image capturing device.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Reference will now be made in detail to the embodiments of the present invention. While the invention will be described in conjunction with these embodiments, it will be understood that they are not intended to limit the invention to these embodiments. Additional advantages and aspects of the present disclosure will become readily apparent to those skilled in the art from the following detailed description. As will be described, the present disclosure is capable of modification in various obvious respects, all without departing from the spirit of the present disclosure. Accordingly, the drawings and description are to be regarded as illustrative in nature, and not as limitative.

Figure 1:
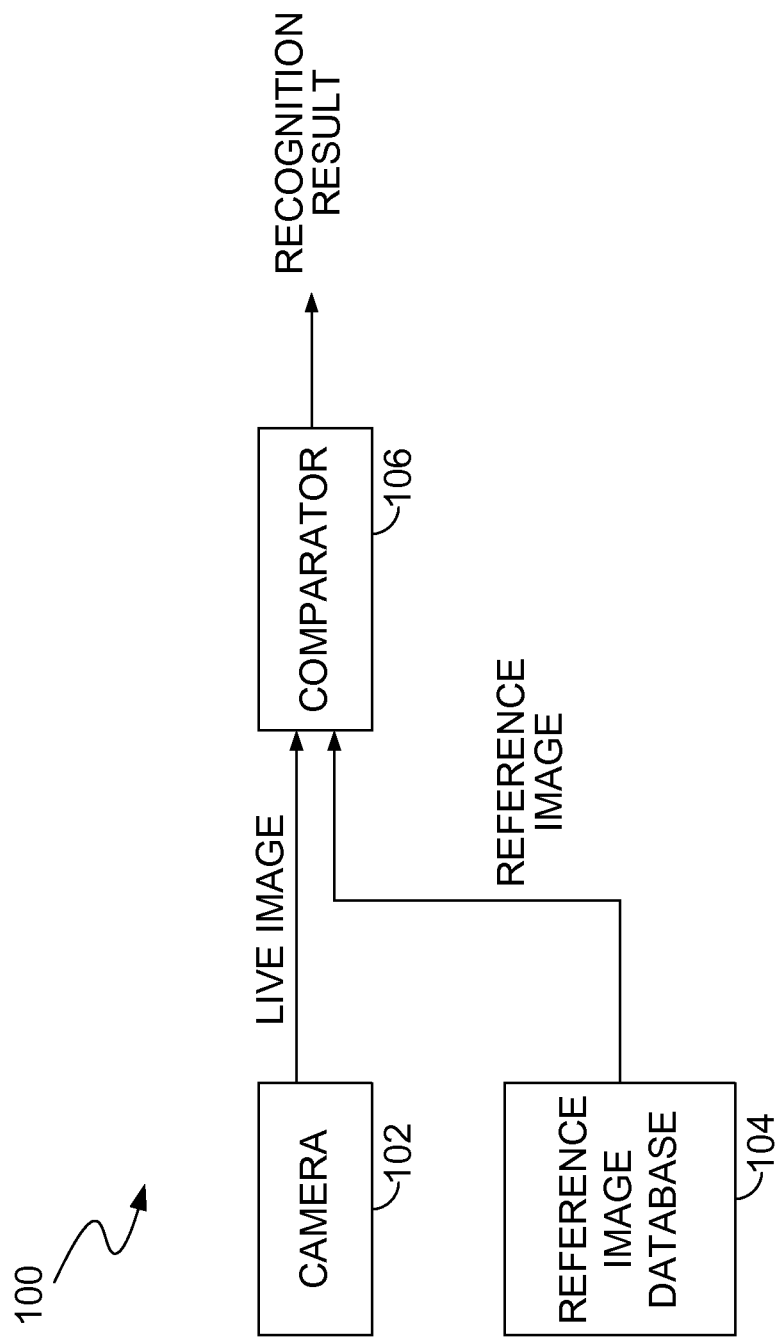
FIG. 1 illustrates a conventional facial recognition system.
Figure 2:
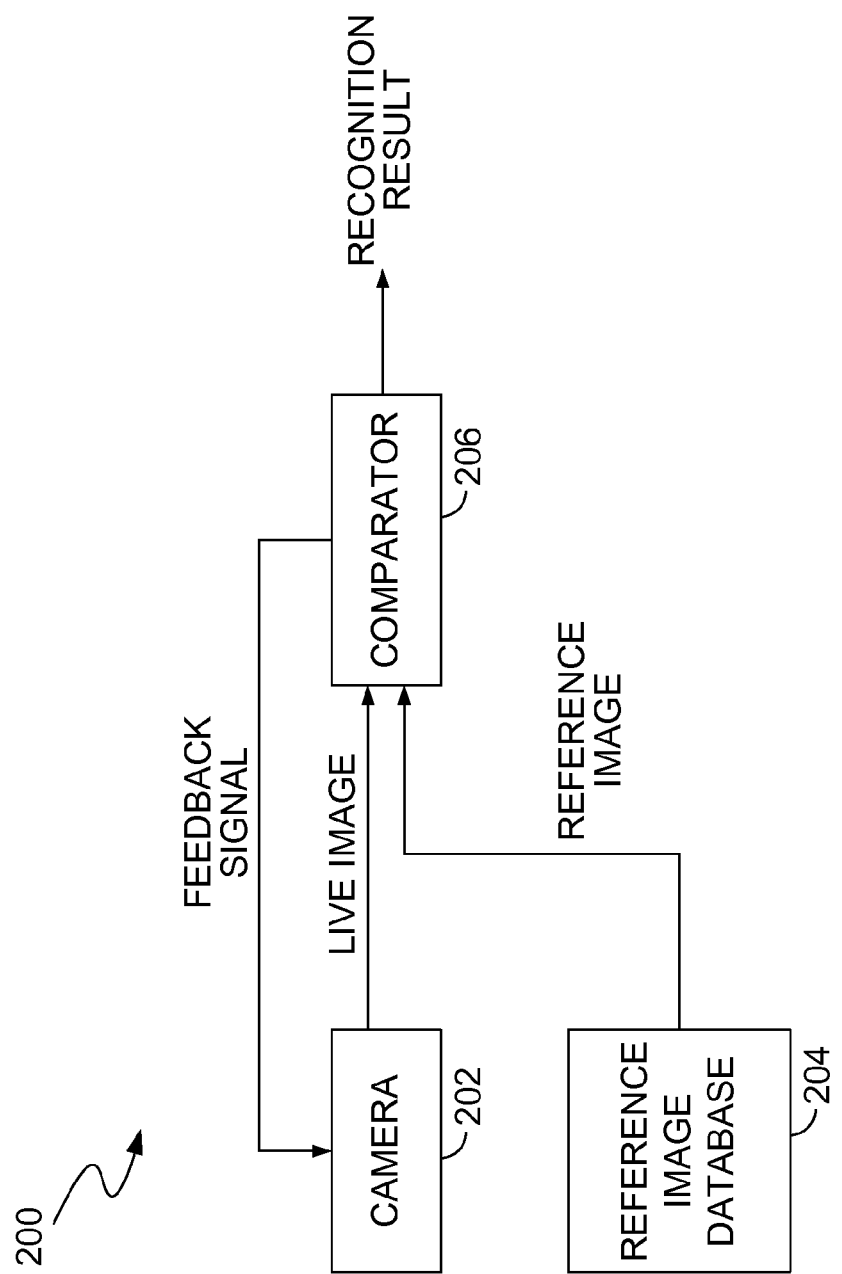
FIG. 2 illustrates a facial recognition system, in accordance with one embodiment of the present invention.

FIG. 2 illustrates a facial recognition system 200, in accordance with one embodiment of the present invention. The facial recognition system 200 includes an image capturing device, such as a camera 202, a reference image database 204, and a comparator 206. One or more reference images can be stored in the reference image database 204. The camera 202 is capable of capturing a live image. The comparator 206 is coupled to the camera 202 and is capable of generating a feedback signal to the camera 202 by comparing the live image with at least one reference image and is capable of adjusting at least one setting of the camera 202 based on the feedback signal. The comparator 206 is further capable of determining a direction of adjustment of the camera setting(s).

In operation, the camera 202 captures a first live image of a person (e.g., a user of the facial recognition system 200) and forwards the first live image to the comparator 206. The comparator 206 compares the first live image with the reference image(s) in the reference image database 104 to determine a first matching percentage which can indicate a similarity between the first live image and the reference image(s), and to determine whether the first live image is matched to a reference image of a person (or matched to a group of reference images of a person), in one embodiment.

In one embodiment, the reference image database 204 stores multiple reference images of multiple persons, and each person has a corresponding reference image. The first matching percentage can be a percentage that the first live image matches to a reference image of a person, which has the highest similarity to the first live image. For example, assume that the reference image database 104 stores three reference images representing three persons A, B and C respectively. The similarity between the first live image and the reference image of person B is higher than the similarity between the first live image and the reference image of person A, and is also higher than the similarity between the first live image and the reference image of person C. As such, the first matching percentage is a percentage that the first live image matches to the reference image of person B, which indicates a similarity between the first live image and the reference image of person B, in one embodiment.

In another embodiment, the reference image database 204 stores multiple reference images of multiple persons, and each person has a group of corresponding reference images. The first matching percentage can be a percentage that the first live image matches to a group of reference images of a person, which have the highest similarity to the first live image. For example, assume that the reference image database 104 stores three group of reference images representing three persons A, B and C respectively. The similarity between the first live image and the group of reference images of person B is higher than the similarity between the first live image and the group of reference images of person A, and is also higher than the similarity between the first live image and the group of reference images of person C. As such, the first matching percentage is a percentage that the first live image matches to the group of reference images of person B, which indicates a similarity between the first live image and the group of reference images of person B, in one embodiment.

Furthermore, the comparator 206 can generate a feedback signal according to a result of the comparison. For example, the comparator 206 can generate a feedback signal to adjust one or more camera settings if no matched reference image is found (e.g., the first matching percentage is less than a predetermined threshold). Advantageously, at least one setting (e.g., an image brightness setting, an image contrast setting, an image color setting, a zoom-in/zoom-out setting, etc.) of the camera 202 can be adjusted by the feedback signal to obtain a better camera setting to capture a second live image. More specifically, the feedback signal can adjust one or more camera settings to reproduce the original lighting and/or color conditions of the reference image(s), in one embodiment. As such, a matching percentage of the second live image based on the adjusted camera setting(s) can be increased, and thus increasing the possibility of a successful recognition.

In one embodiment, the comparator 206 generates a feedback signal to adjust a first setting, such as an image brightness setting, e.g., to increase the image brightness. The feedback signal can include some commands that can adjust the camera settings through a driver of the camera, in one embodiment.

The camera 202 captures a second live image based on the adjusted setting and forwards the second live image to the comparator 206. The comparator 206 compares the second live image with the reference image(s) to determine a second matching percentage which can indicate a similarity between the second live image and the reference image(s), in one embodiment. The second matching percentage can be determined in a way that is similar to the way in determining the first matching percentage described above and will not be repetitively described herein for purposes of brevity and clarity.

In one embodiment, if the second matching percentage is greater than the first matching percentage, the comparator 206 can generate a feedback signal to further adjust the first setting in the same direction, e.g., to further increase the image brightness, so as to capture a third live image which can be brighter than the second live image, and make the comparison again. In one embodiment, if the second matching percentage is less than the first matching percentage, the comparator 206 generates a feedback signal to adjust the first setting in an opposite direction, e.g., to decrease the image brightness, so as to capture a third live image which can be darker than the second live image. Advantageously, by repeating the aforementioned process, e.g., adjusting the first setting repetitively according to the feedback signal, the first setting can be automatically optimized so as to reproduce the original condition (e.g., lighting condition) of the reference image(s).

After adjusting the first setting (e.g., the image brightness setting in the above example) repetitively, the system can further adjust other camera settings, e.g., a second setting, such as an image contrast setting, and can perform the above mentioned repetitive process. Finally, the camera settings can be automatically optimized so as to reproduce the original conditions (e.g., lighting condition and color condition) of the reference image(s), and a live image with the highest matching percentage can be obtained after adjusting different types of settings of the camera 202, in one embodiment.

The comparator 206 can generate a final recognition result based on the highest matching percentage after adjusting one or more camera settings. In one embodiment, if the highest matching percentage is greater than a predetermined threshold, which can indicate that the live image is successfully matched to a reference image of a person or to a group of reference images of a person, then the facial recognition system 200 declares a successful recognition. If the highest matching percentage is less than the predetermined threshold, which can indicate that no matched reference image is found in the reference image database 204, then the facial recognition system 200 declares a recognition failure. The predetermined threshold can be set/programmed by a user/administrator of the facial recognition system 200.

Advantageously, in one embodiment, the camera settings can be automatically optimized by a feedback signal generated by the comparator 206 based on the live image and the reference image(s). With the optimized settings, the facial recognition system 200 can reproduce the original conditions (e.g., lighting and/or color conditions) of the reference image(s), and optimize the recognition probability, which can help improve the recognition process.

Figure 3:
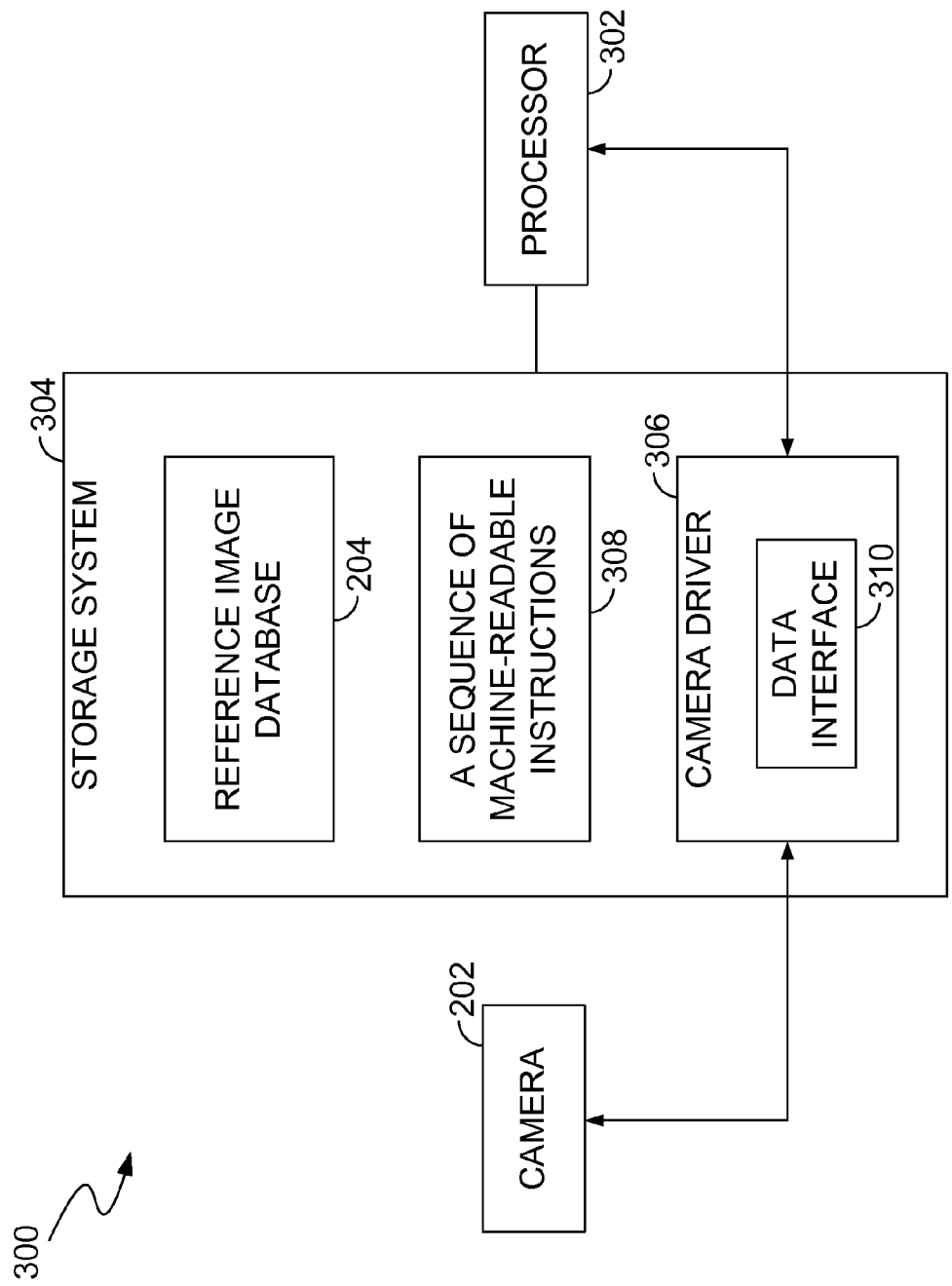
FIG. 3 illustrates a computer system, in accordance with one embodiment of the present invention.

FIG. 3 illustrates a computer system 300 according to one embodiment of present invention. FIG. 3 shows an implementation of the facial recognition system 200 in FIG. 2 on a computer system 300. Elements labeled the same as in FIG. 2 have similar functions and will not be repetitively described herein for purposes of brevity and clarity.

The computer system 300 includes an image capturing device, such as a camera 202, for capturing a live image. A storage system 304 is capable of storing a sequence of machine-readable instructions 308. The storage system 304 can also store a reference image database 204 including one or more reference images. The storage system 304 can be volatile memory such as static random access memory (SRAM), non-volatile memory such as hard disk drive, or any combination thereof. A processor 302 is coupled to the storage system 304 for executing the sequence of machine-readable instructions 308 to perform the functionalities of the comparator 206 showing in FIG. 2, e.g., to generate a feedback signal which can adjust at least one setting of the camera 202 by comparing the first live image with the reference image(s). The camera 202 is coupled to the processor 302 via a camera driver 306. The camera driver 306 includes a data interface 310 that can be various kinds of interfaces, including but is not limited to, standard Windows USB video device class interface and an alternate device software programming interface. Through the data interface 310 in the camera driver 306, the processor 302 is capable of adjusting at least one setting of the camera 202 by the feedback signal. The processor 302 can be further capable of acquiring information about current camera settings through the data interface 310.

In operation, the camera 202 captures a live image. The processor 302 executes the sequence of machine-readable instructions 308 to compare the live image with the reference image(s) from the reference image database 204. The processor 302 can generate a feedback signal by comparing the live image with the reference image(s). In one embodiment, the feedback signal can include some commands that can adjust the camera settings through the data interface 310 in the camera driver 306. As a result, the camera settings can be adjusted according to the feedback signal through the data interface 310 in the camera driver 306, based on the live image and the reference image(s).

Figure 4:
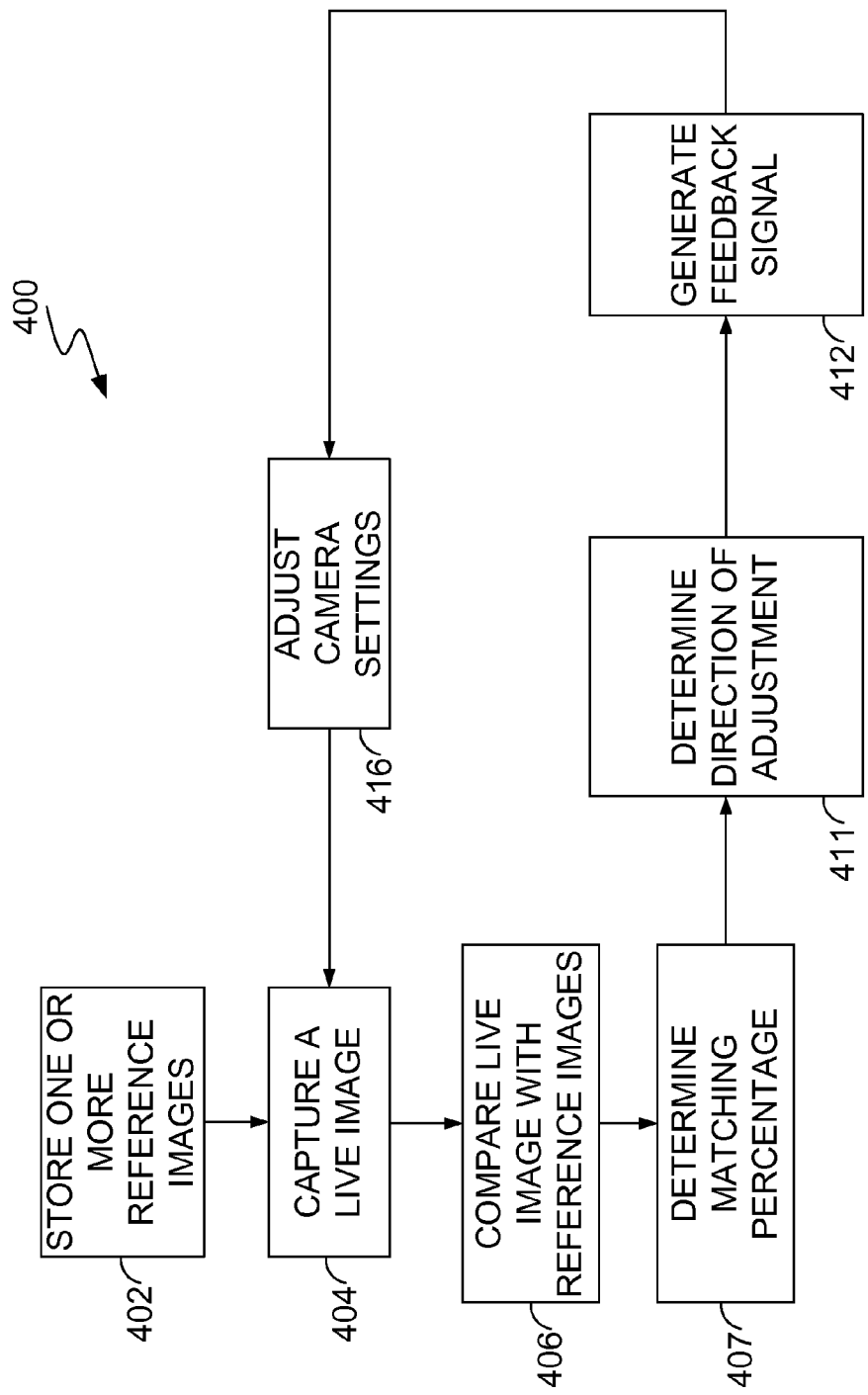
FIG. 4 illustrates a flowchart of optimizing camera settings, in accordance with one embodiment of the present invention.

FIG. 4 illustrates a flowchart 400 of optimizing camera settings, in accordance with one embodiment of the present invention. FIG. 4 is described in combination with FIG. 2. Although specific steps are disclosed in FIG. 4, such steps are exemplary. That is, the present invention is well suited to performing various other steps or variations of the steps recited in FIG. 4.

In block 402, one or more reference images are stored in a reference image database 204. In block 404, the camera 202 captures a live image of a current user. In block 406, the live image is compared with a reference image or with a group of reference images in the reference image database 204, by the comparator 206. In block 407, a current matching percentage is determined by the comparator 206 based on the live image and the reference image(s). In block 411, if a previous matching percentage is available, a direction of adjustment is determined by the comparator 206 based on the current and previous matching percentage. If the current matching percentage is greater than the previous matching percentage, a forward direction of adjustment is determined, in one embodiment. If the current matching percentage is less than the previous matching percentage, a backward direction of adjustment is determined, in one embodiment. In block 412, a feedback signal is generated by the comparator 206 based on the live image and the reference image(s) and based on the direction of adjustment. In block 416, at least one setting of the camera 202 is adjusted by the feedback signal. In one embodiment, an image brightness setting is adjusted. In one embodiment, an image contrast setting is adjusted. Then the flowchart 400 goes back to block 404 to capture a second live image, after at least one setting of the camera 202 is adjusted. Steps followed by block 404 have been described and will not be repetitively described herein for purposes of brevity and clarity.

This method of optimizing the settings of the camera in the present disclosure is not limited in facial recognition system. It can also be used in other webcam applications, such as video conference systems and online instant messengers, to optimize settings of the camera based on a feedback according to a comparison between a current live image and the pre-stored reference image(s). Therefore, the performance of such webcam applications can be improved.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A recognition system, coupled to an image capturing device, that determines a first matching percentage by comparing a first live image with a first reference image, that determines a second matching percentage by comparing a second live image with said first reference image, that compares said first matching percentage with said second matching percentage to determine a direction of adjustment of a setting of said image capturing device, and that generates a feedback signal to adjust said setting based on said direction of adjustment, wherein said first live image and said second live image are captured by said image capturing device.

2. The recognition system of claim 1, wherein said setting is adjusted in a first direction after said first live image is captured but before said second live image is captured.

3. The recognition system of claim 2, wherein if said second matching percentage is greater than said first matching percentage, said direction of adjustment is the same as said first direction, and wherein said feedback signal adjusts said setting in said first direction.

4. The recognition system of claim 2, wherein if said second matching percentage is less than said first matching percentage, said direction of adjustment is opposite to said first direction, and wherein said feedback signal adjusts said setting in an opposite direction of first direction.

5. The recognition system of claim 4, wherein said first direction comprises an increase of said setting, and said opposite direction of said first direction comprises a decrease of said setting.

6. The recognition system of claim 1, further comprising:
  a reference image database that stores a plurality of reference images,
  wherein said first matching percentage indicates a similarity between said first live image and said first reference image, and wherein among said reference images, said first reference image has the highest similarity to said first live image.

7. The recognition system of claim 6, wherein said second matching percentage indicates a similarity between said second live image and said first reference image, and wherein among said reference images, said first reference image has the highest similarity to said second live image.

8. The recognition system of claim 6, wherein said reference image database stores said plurality of reference images for a plurality of users, and wherein each reference image of said reference images corresponds to a user.

9. A computer system comprising:
  an image capturing device that captures a first live image and a second live image;
  a storage medium, coupled to said image capturing device, that stores a sequence of instructions;
  a processor, coupled to said storage medium, that executes said sequence of instructions to determine a first matching percentage by comparing said first live image with a first reference image, to determine a second matching percentage by comparing said second live image with said first reference image, to compare said first matching percentage with said second matching percentage to determine a direction of adjustment of a setting of said image capturing device, and to generate a feedback signal to adjust said setting based on said direction of adjustment.

10. The computer system of claim 9, wherein said feedback signal is sent to said image capturing device via a driver coupled between said processor and said image capturing device.

11. The computer system of claim 9, wherein said first live image comprises an image of a user that uses said computer system.

12. The computer system of claim 9, wherein said setting is adjusted in a first direction after said first live image is captured but before said second live image is captured.

13. The computer system of claim 12, wherein if said second matching percentage is greater than said first matching percentage, said direction of adjustment is the same as said first direction, and wherein said feedback signal adjusts said setting in said first direction.

14. The computer system of claim 12, wherein if said second matching percentage is less than said first matching percentage, said direction of adjustment is opposite to said first direction, and wherein said feedback signal adjusts said setting in an opposite direction of first direction.

15. The computer system of claim 9, wherein said storage medium further stores a plurality of reference images, wherein said first matching percentage indicates a similarity between said first live image and said first reference image, and wherein among said reference images, said first reference image has the highest similarity to said first live image.

16. The computer system of claim 15, wherein said second matching percentage indicates a similarity between said second live image and said first reference image, and wherein among said reference images, said first reference image has the highest similarity to said second live image.

17. A method for adjusting a setting of an image capturing device, comprises:
    capturing a first live image and a second live image;
    determining a first matching percentage by comparing said first live image with a first reference image;
    determining a second matching percentage by comparing said second live image with said first reference image;
    determining a direction of adjustment of said setting by comparing said first matching percentage with said second matching percentage; and
    generating a feedback signal to adjust said setting based on said direction of adjustment.

18. The method of claim 17, further comprising:
    adjusting said setting in a first direction after said first live image is captured but before said second live image is captured.

19. The method of claim 18, further comprising:
    adjusting said setting in said first direction if said second matching percentage is greater than said first matching percentage.

20. The method of claim 18, further comprising:
    adjusting said setting in an opposite direction to said first direction if said second matching percentage is less than said first matching percentage.

21. The method of claim 17, further comprising:
    storing a plurality of reference images,
    wherein said first matching percentage indicates a similarity between said first live image and said first reference image, and wherein among said reference images, said first reference image has the highest similarity to said first live image.

* * * * *